(12) United States Patent
Miller et al.

(10) Patent No.: US 6,275,546 B1
(45) Date of Patent: Aug. 14, 2001

(54) GLITCHLESS CLOCK SWITCH CIRCUIT

(75) Inventors: John P. Miller, Rocklin; Michael S. Vacanti, Roseville, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/107,118

(22) Filed: Jun. 30, 1998

(51) Int. Cl.[7] .................................................. H04L 7/00
(52) U.S. Cl. ............................................ 375/354; 713/501
(58) Field of Search .............................. 375/354; 713/400, 713/500, 501

(56) References Cited

U.S. PATENT DOCUMENTS 5,572,718 * 11/1996 Scriber et al. ....................... 713/500
5,638,083 * 6/1997 Margeson ............................... 345/10
5,790,609 * 8/1998 Swoboda ............................. 375/357
5,903,746 * 5/1999 Swoboda et al. ..................... 713/501
6,094,727 * 7/2000 Manning .............................. 713/400

* cited by examiner

*Primary Examiner*—Chi Pham
*Assistant Examiner*—Phuong Phu

(57) ABSTRACT

Apparatus is disclosed for producing an output clock signal that is selectively synchronized to one of two generally free-running input clock signals that may be of the same or different frequency and phase. The apparatus is adapted to switch between the two input clock signals in a manner whereby the output clock signal does not have any clock pulses that are shrunk or narrowed.

13 Claims, 2 Drawing Sheets

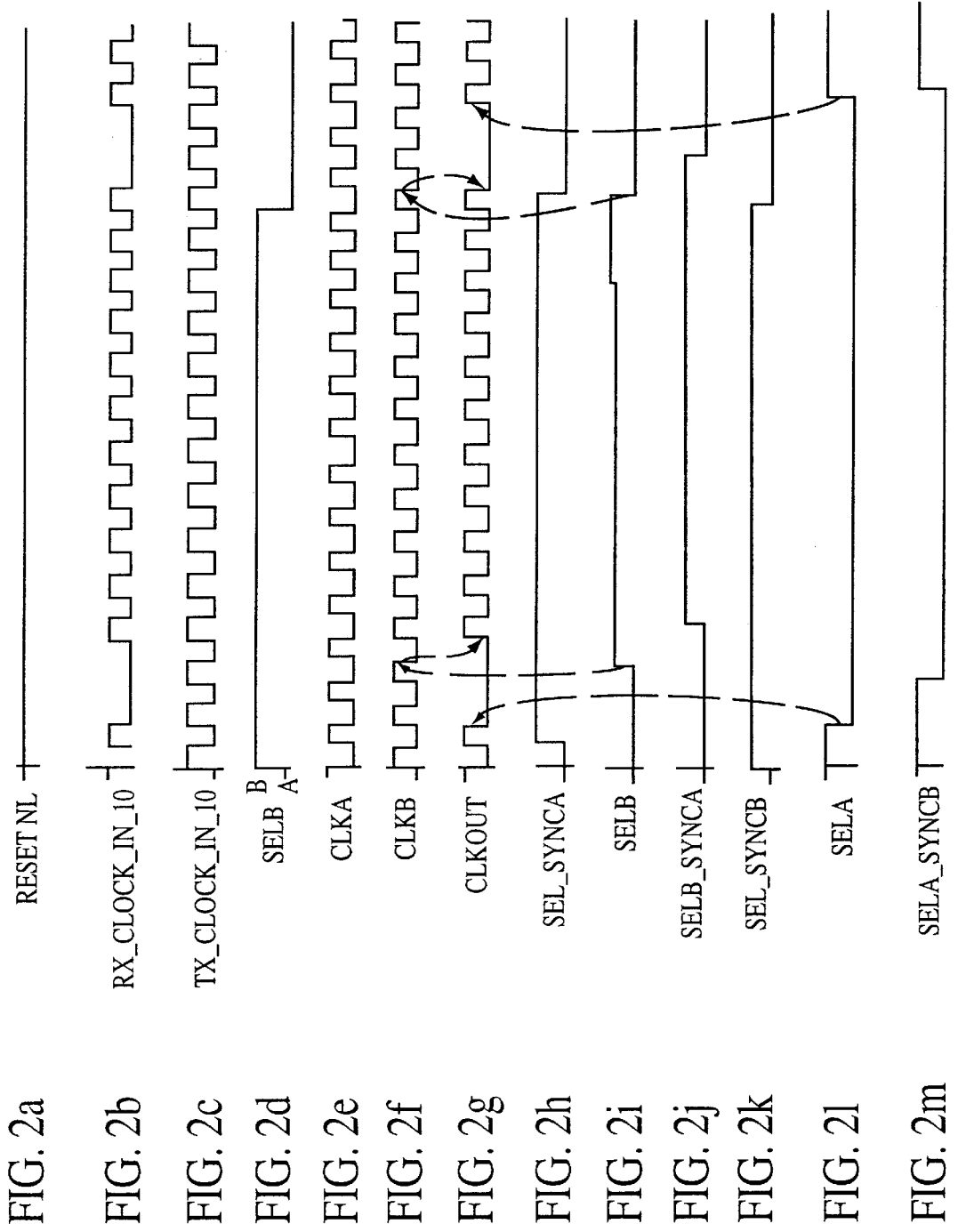

GLITCHLESS CLOCK SWITCH CIRCUIT

Figure 1:
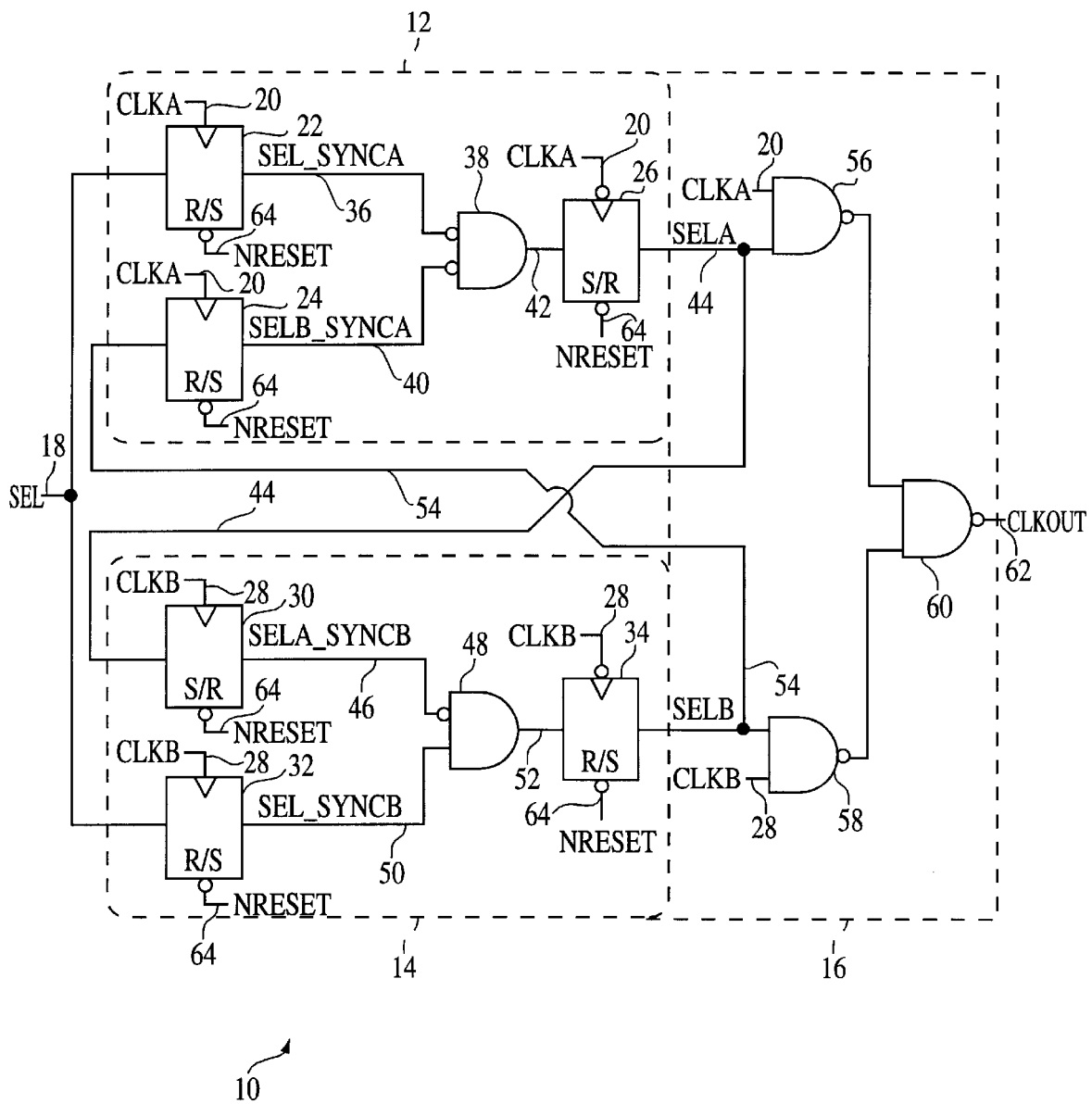

The present invention generally relates to digital electronic circuitry, and more particularly to a switching circuit for switching between two separate input clock signals for producing an output clock signal that is synchronized to one of the input clock signals.

It is common in computer networking environments, as well as other environments where data is transferred between devices that different clock signals are used to control the communication during transmitting and receiving modes of operation. This is the case, for example, when communicating between a personal computer (PC) and a networking device, where the networking device has its own clock signal and the PC would have a clock signal for its data, so that when data comes into the PC, two separate clocks would be present. One clock would be used to transmit data out and the other would be used to receive the data. There are other similar situations where it is necessary to switch between two free-running input clock signals, which may be at the same frequency or at a different frequency and/or phase. It is important that the switching is done in a manner which does not disrupt the operation or integrity of the communication of the data that is being transferred.

A common problem that is associated with the switching from one clock to another is that a clock pulse width at or near the switching operation will be shrunk, i.e., it will be less than the fall clock pulse width or period. For high frequency clock signals, the narrower pulse width, which may be characterized as a sliver may not be capable of being detected by a storage device, for example, and some disruption of accurate communication can easily result. The producing of such narrower than standard pulse widths or shorter clock periods are defined herein as being glitches.

Accordingly, it is a primary object of the present invention to provide an improved clock switching apparatus which prevents glitches in the resulting output clock signal.

Another object is to provide such an improved apparatus which reliably operates to switch between two input clock signals which may be of different frequency and phase.

Still another object of the present invention is to provide such an improved apparatus which prevents the shrinking of the output clock period or clock width during switchover.

Yet another object of the present invention is to provide such an improved apparatus while utilizing a small number of components.

Other objects and advantages will become apparent upon reading the following detailed description, in conjunction with the attached drawings, in which:

FIG. 1 is an electrical schematic diagram of circuitry embodying the present invention; and, FIGS. 2a–2m are timing diagrams illustrating operation of the circuitry of FIG. 1.

DETAILED DESCRIPTION

Broadly stated, the present invention is directed to an apparatus in the form of electrical circuitry for producing an output clock signal that is selectively synchronized to one of two generally free-running input clock signals and has provision for switching between the input clock signals in a manner whereby the output clock signal does not have any clock pulses that are shrunk or narrowed. In other words, the output clock signal is free of glitches.

It should be understood that the apparatus is adapted to run at high frequencies in excess of 25 MHZ or more and is adapted to selectively synchronize the output clock signal to one of two input clock signals that may be the same frequency with different phases or may be different frequencies. During operation and at switchover from one input clock signal to the other, the output clock signal never has a shrinking, i.e., narrowing, of either a high or low pulse. Depending upon the phase difference and frequency difference, it is possible that the output signal will have a wider or lengthened output pulse, but it will never have an output pulse that is narrower than the normal width or clock period.

Turning now to the drawings, and particularly FIG. 1, the apparatus is indicated generally at 10 and includes a first circuit portion 12, a second circuit portion 14 and a switchover portion 16. A selecting (SEL) signal is applied on line 18 which is adapted to select either clock A (CLKA) or clock B (CLKB) depending upon the level of the SEL signal applied. In the circuit illustrated in FIG. 1, the SEL signal being low selects the clock A and a high level selects clock B. Clock A is applied to the circuit portion 12 via line 20 which is adapted to clock each of three D-flip-flops 22, 24 and 26. The clock B signal is applied to the circuit portion 14 via lines 28 which also clock three D-flip-flops 30, 32 and 34.

The output of flip-flop 22 provides a SEL_SYNCA signal on line 36 that is applied to an AND gate 38, the other input of which is SELB_SYNCA which is applied on line 40. The output of the AND gate 38 is applied via line 42 to the flip-flop 26 and its output provides the SELA signal on line 44 which is a handshake signal that extends to the input of flip-flop 30 in circuit portion 14. With regard to the AND gate 38 and other AND gates shown in FIG. 1, it should be understood that a small circle is shown on some of the inputs as well as on the output. This is intended to indicate that the logic level for that input or output is a active low or inverted level.

Circuit portion 14 has a SELA_SYNCB signal on flip-flop 30 output line 46 and this signal is input to AND gate 48, the other input of which is SEL_SYNCB on line 50. The output of gate 48 on line 52 is input to the flip-flop 34, the output of which is the SELB handshake signal on line 54 that extends to the input of flip-flop 24. Lines 44 and 54 additionally are respectively applied to the switchover portion 16 and particularly to inputs of AND gates 56 and 58, the other inputs of which are clock A on line 20 and clock B on line 28. The output of the gates 56 and 58 are applied to the inputs of AND gate 60, the output of which is the clock out (CLKOUT) signal on line 62.

During operation, a change in the SEL signal level from low to high switches the input clock signal that is to be used for generating the synchronized output signal from clock A to clock B. This high level is applied to both flipflops 22 and 32, with the flip-flop 32 being clocked by the clock B signal whereas the flip-flop 22 is clocked by the clock A signal. The SEL signal is thereby synchronized to the clock A in circuit portion 12 and to clock B in circuit portion 14.

Assuming that the SEL signal is changed to select clock B, the SEL signal is synchronized to clock A and that signal on line 36 results in the SELA signal going low as shown in FIG. 2*l* which disables the switchover portion 16 causing the output clock CLKOUT signal on line 62 to be forced low as shown in FIG. 2*g*. The SEL signal is also synchronized to clock B by flip-flop 32 and the disabling of the clock A is propagated through the handshake signal via line 44 and flip-flop 30 and select SELB on line 54 is then switched high which enables clock B on the negative edge thereof as shown in FIG. 2*f* which results in the normal pulse width CLKOUT signal being produced on line 62 as shown in FIG. 2g. Similar operation is shown at the rightward side of the timing diagram of FIG. 2 where the SEL signal in FIG. 2d goes low indicating a switch to clock A. This results in a long low pulse in the CLKOUT signal (FIG. 2g) before the normal pulse width CLKOUT signal is released in synchronization with clock A. By examining the CLKOUT signal of FIG. 2g, it is clear that there are no narrow or sliver pulses, i.e., less than the normal pulse width at or near the time of a switchover. All of the flip-flops shown also contain either a R/S or S/R designator inside the block which indicates that it is either a set or a reset type flip-flop. A R/S flip-flop has a 0 output default and a S/R flip-slop has a 1 output default. It should also be understood that the circuit illustrated in FIG. 1 has a default clock A operation upon application of the RESET NL signal on line 64. If the default value is to be clock B, then the type of flip-flops would be reversed from that shown in FIG.1, i.e., an R/S type should be changed to an S/R type and visa versa.

From the foregoing description, it should be understood that an improved switching circuit has been shown and described which has many desirable attributes and advantages. It is adapted to switch between two free running clock signals that may be of different frequency and/or phase and operates in a reliable manner so that no narrow pulses are produced in the output that could effect the operation of circuitry for which a clock signal is used.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for producing an output clock signal that is synchronized to one of first and second input clock signals and for switching between a first input clock signal and a second input clock signal in response to receiving a signal for selecting the other input clock signal, the switching being accomplished in a manner whereby less than full width clock pulses are prevented during the switching, said apparatus comprising:
   first circuit means adapted to receive the first input clock signal and the selecting signal indicating a change from the second input clock signal to the first input clock signal and to produce a first handshake signal on a first output synchronized to said second input clock signal; said first circuit means including first synchronizing means for synchronizing the selecting to the second input clock signal, and second synchronizing means for syncronizing a second handshake signal to said first input clock signal;
   second circuit means adapted to receive the second input clock signal and the selecting signal indicating a change from the first input clock signal to the second input clock signal and to produce the second handshake signal on a second output synchronized to said first input clock signal; said second circuit means including third synchronizing means for synchronizing the selecting signal to the first input clock signal, and fourth synchronizing means for synchronizing said first handshake signal to said second input clock signal; and,
   switchover means connected to receive said respective handshake signals from each of said first and second circuit means for producing said output clock signal in a manner whereby less than full width clock pulses are prevented in said output clock signal.

2. The apparatus as defined in claim 1 wherein said first, second, third and fourth synchronizing means comprise first, second, third and fourth flip-flops, respectively.

3. The apparatus as defined in claim 1 wherein said switchover means comprises:
   a first AND gate connected to receive said first handshake signal produced by said first circuit means and the first input clock signal;
   a second AND gate connected to receive said second handshake signal produced by said second circuit means and said second input clock signal; and,
   a third AND gate connected to the outputs of said first and second AND gates.

4. The apparatus as defined in claim 1 wherein said first output is connected to the input of said fourth synchronizing means.

5. The apparatus as defined in claim 1 wherein said second output is connected to the input of said second synchronizing means.

6. The apparatus as defined in claim 1 wherein said first circuit means further comprises:
   a fifth AND gate having two active low inputs respectively connected to the outputs of said first and second synchronizing means; and,
   a fifth flip-flop connected to the output of said fifth AND gate, said fifth flip-flop producing said first handshake signal.

7. The apparatus as defined in claim 1 wherein said second circuit means further comprises:
   a sixth AND gate having an active high and an active low input connected to the outputs of said first and second synchronizing means; and,
   a seventh flip-flop connected to the output of said sixth AND gate, said seventh flip-flop producing said second handshake signal.

8. The apparatus as defined in claim 1 wherein the selecting signal comprises a signal that can be one of a high and low signal level, the selecting signal corresponding to a transition between the high and low signal levels.

9. Apparatus for producing an output clock signal having generally continuously occurring clock pulses of predetermined width, said output clock being synchronized to the selected one of first and second input clock signals, said apparatus being adapted to switch between said input clock signals in response to receiving a signal for selecting the nonselected one of the input clock signals for use for synchronization, the apparatus being adapted to accomplish the switching between input clock signals without producing any output clock signal clock pulses that are less than said predetermined width, said apparatus comprising;
   a first circuit means adapted to receive the first input clock signal and produce a first handshake signal at a first output;
   a second circuit means adapted to receive the second input clock signal and produce a second handshake signal at a second output;
   said first circuit means including means for synchronizing the selecting signal to the used input clock, said synchronizing means being connected to receive said second handshake signal and disable a switchover means until released by a predetermined clock pulse edge of the first input clock is produced at said second output;

said second circuit means including means for synchronizing the selecting signal to the used input clock, said synchronizing means being connected to receive said first handshake signal and disable said switchover means until released by a predetermined clock pulse edge of the second input clock is produced at said first output; and, switchover means connected to receive said respective handshake signals from each of said first and second circuit means for selectively producing said output clock signal in a manner whereby less than full width clock pulses are prevented in said output clock signal.

10. The apparatus as defined in claim 9 wherein said switchover means comprises:

a first AND gate connected to receive said first handshake signal produced by said first circuit means and the first input clock signal;

a second AND gate connected to receive said second handshake signal produced by said second circuit means and said second input clock signal; and, a third AND gate connected to the outputs of said first and second AND gates.

11. The apparatus as defined in claim 9 wherein said first circuit means further comprises:

a fifth AND gate having two active low inputs respectively connected to the outputs of said first circuit synchronizing means; and, a fifth flip-flop connected to the output of said fifth AND gate, said fifth flip-flop producing said first handshake signal.

12. The apparatus as defined in claim 9 wherein said second circuit means further comprises:

a sixth AND gate having one active high and one active low input respectively connected to the outputs of said second circuit synchronizing means; and, a seventh flip-flop connected to the output of said sixth AND gate, said seventh flip-flop producing said second handshake signal.

13. Apparatus for producing an output clock signal that is synchronized to one of first and second input clock signals and for switching between a first input clock signal and a second input clock signal in response to receiving a signal for selecting the other input clock signal, the switching being accomplished in a manner whereby less than full width clock pulses are prevented during the switching, said apparatus comprising:

first circuit means adapted to receive the first input clock signal and the selecting signal indicating a change from the second input clock signal to the first input clock signal and to produce a first handshake signal on a first output synchronized to said second input clock signal; said first circuit means including first synchronizing means for synchronizing the selecting signal to the second input clock signal, and second synchronizing means for synchronizing said second handshake signal to said first input clock signal, wherein said first circuit means further comprising a fifth AND gate having two active low inputs respectively connected to the outputs of said first and second synchronizing means, and a fifth flip-flop connected to the output of said fifth AND gate, said fifth flip-flop producing said first handshake signal;

second circuit means adapted to receive the second input clock signal and the selecting signal indicating a change from the first input clock signal to the second input clock signal and to produce a second handshake signal on a second output synchronized to said first input clock signal, said second circuit means including third synchronizing means for synchronizing the selecting signal to the first input clock signal, and fourth synchronizing means for synchronizing said first handshake signal to said second input clock signal, a sixth AND gate having an active high and an active low input connected to the outputs of said first and second synchronizing means and a seventh flip-flop connected to the output of said sixth AND gate, said seventh flip-flop producing said second handshake signal;

said first output being connected to the input of said fourth synchronizing means, and said second output being connected to the input of said second synchronizing means; and, switchover means connected to receive said respective handshake signals from each of said first and second circuit means for producing said output clock signal in a manner whereby less than full width clock pulses are prevented in said output clock signal, said switchover means further comprising a first AND gate connected to receive said handshake signal produced by said first circuit means and the first input clock signal, a second AND gate connected to receive said handshake signal produced by said second circuit means and said second input clock signal, and a third AND gate connected to the outputs of said first and second AND gates.

\* \* \* \* \*

UNITED STATES PATENT AND TRADEMARK OFFICE
CERTIFICATE OF CORRECTION

PATENT NO. : 6,275,546 B1
DATED : August 14, 2001
INVENTOR(S) : Miller et al.

Page 1 of 1

It is certified that error appears in the above-identified patent and that said Letters Patent is hereby corrected as shown below:

Column 3,
Line 52, after "selecting" insert -- signal --

Signed and Sealed this

Twenty-fourth Day of June, 2003

JAMES E. ROGAN
*Director of the United States Patent and Trademark Office*